United States Patent

Sugiyama et al.

[11] Patent Number: 5,875,045
[45] Date of Patent: Feb. 23, 1999

[54] WAVELENGTH-MULTIPLEXING OPTICAL COMMUNICATION METHOD EMPLOYING RZ SIGNALS, WAVELENGTH-MULTIPLEXING OPTICAL SENDING APPARATUS EMPLOYING RZ SIGNALS, AND WAVELENGTH-MULTIPLEXING OPTICAL COMMUNICATION SYSTEM EMPLOYING RZ SIGNALS

[75] Inventors: Akira Sugiyama, Sapporo; Izumi Yokota, Kawasaki, both of Japan

[73] Assignee: Fujitsu Limited, Kawasaki, Japan

[21] Appl. No.: 768,345

[22] Filed: Dec. 17, 1996

[30] Foreign Application Priority Data

Dec. 25, 1995 [JP] Japan .................................. 7-337091

[51] Int. Cl.[6] .................................................. H04J 14/02
[52] U.S. Cl. ................................................ 359/124; 359/161
[58] Field of Search ................................ 359/124, 126, 359/132–133, 134, 161, 110, 179, 189, 173

[56] References Cited

U.S. PATENT DOCUMENTS 5,574,590  11/1996  Edagawa et al. ........................ 319/179
5,589,969  12/1996  Taga et al. ............................... 319/124

FOREIGN PATENT DOCUMENTS 8-248455   9/1996   Japan .

OTHER PUBLICATIONS

Terahara et al. "85 Gbit/s WDM transmission of 16 5–3 Gbit/s RZ data signals over 7931 km using accurate gain–equalization and pre–compensation of group–velocity dispension" Electronics Letters, 1997, vol. 33, No. 7, pp. 603–605.

*Primary Examiner*—Kinfe-Michael Negash
*Attorney, Agent, or Firm*—Staas & Halsey

[57] ABSTRACT

An RZ (return-to-zero) signal mode is adopted as a transmission coding format, whereby the effect of cross phase modulation is suppressed. The duty factor of each of signal light waves is allowed to vary at a digital signal processing stage, whereby the average power levels of the signal light waves are controlled so as to become constant in an optical repeater, with the result that the peak power levels of the signal light waves are allowed to vary. In consequence, the transmission characteristics of the signal light waves can be varied.

19 Claims, 20 Drawing Sheets

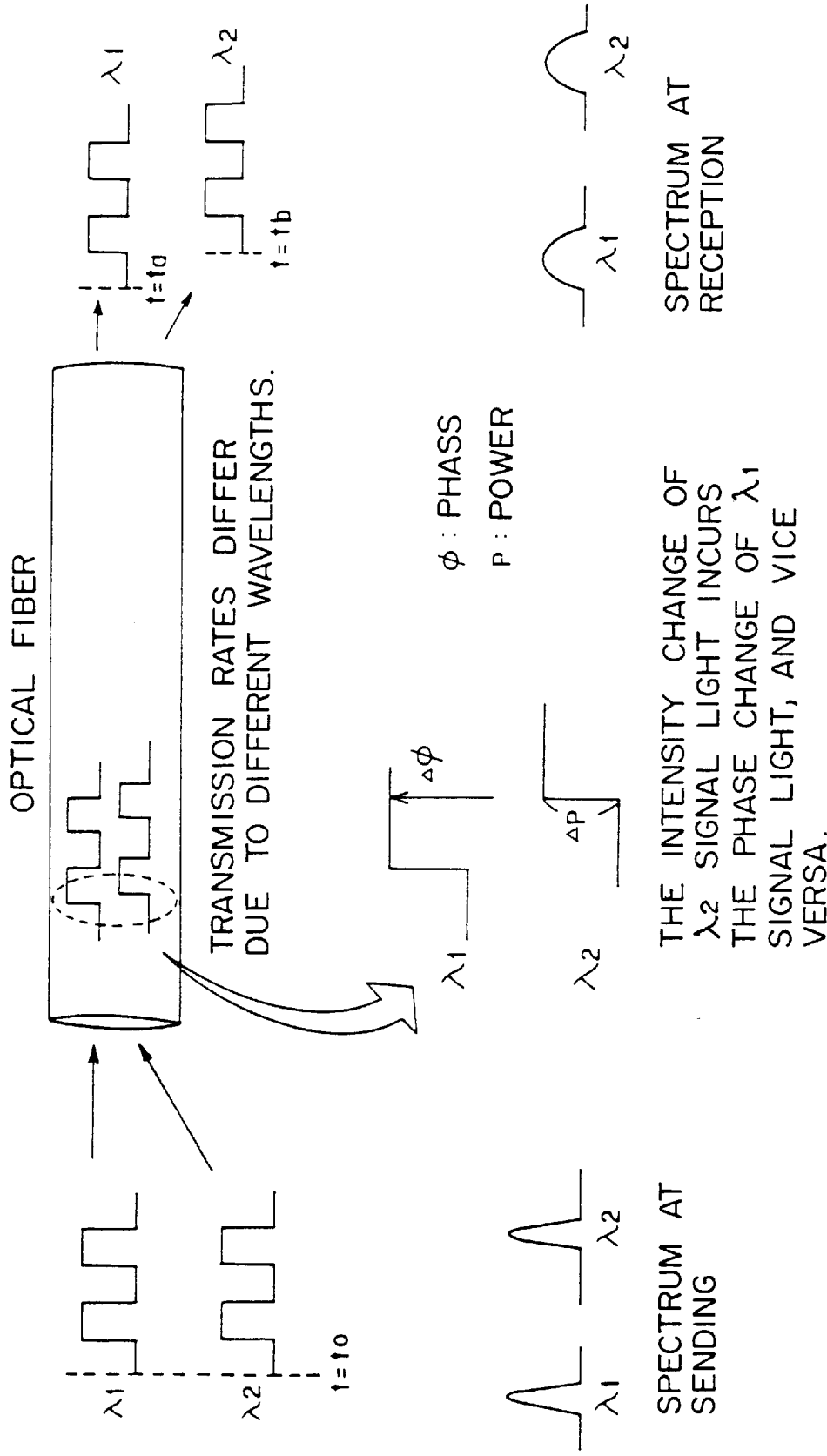

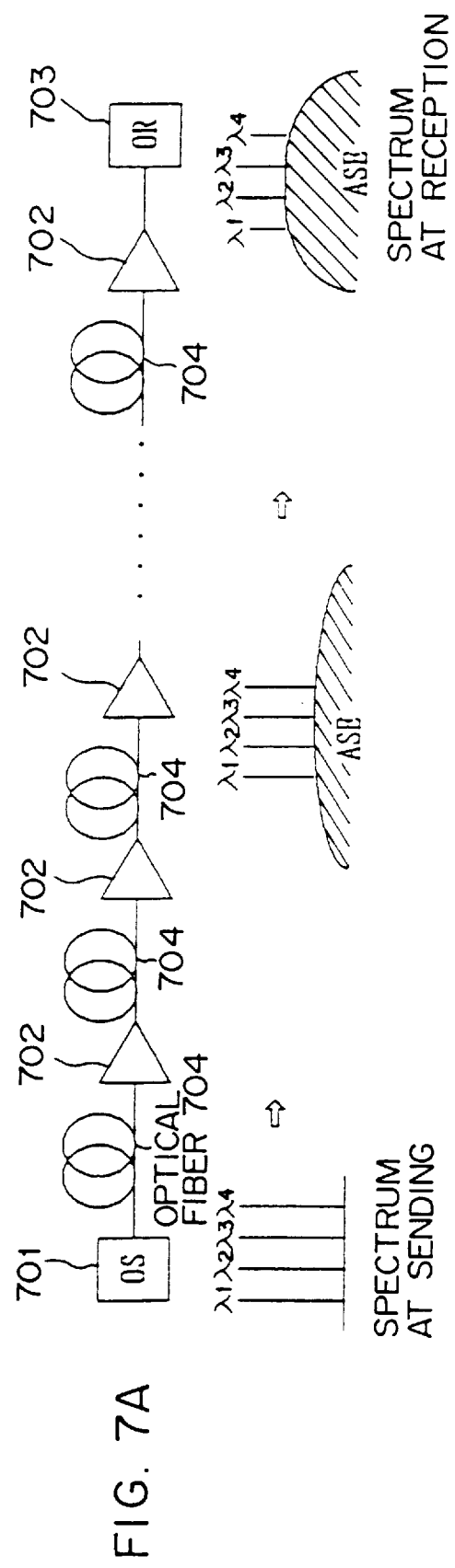

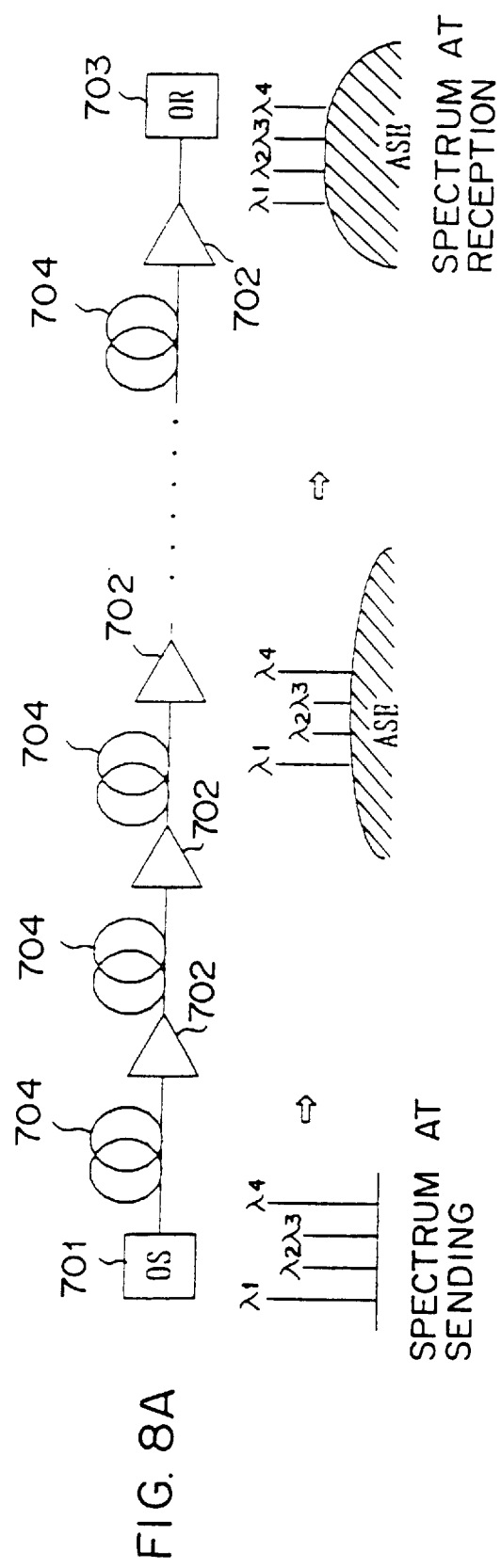

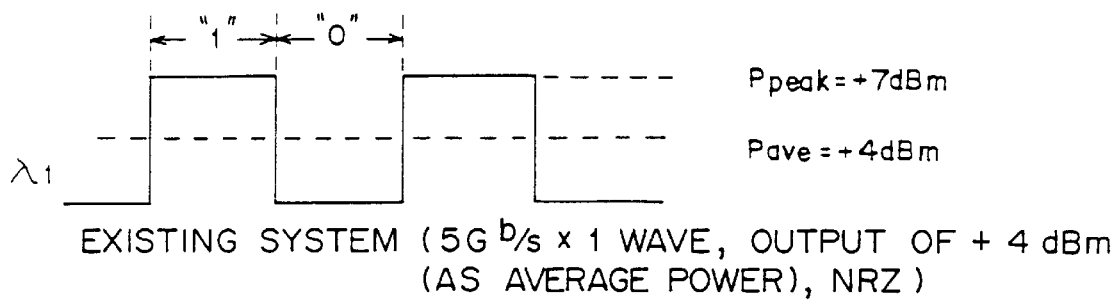
EXISTING SYSTEM (5G b/s × 1 WAVE, OUTPUT OF + 4 dBm (AS AVERAGE POWER), NRZ)
FIG. 11A
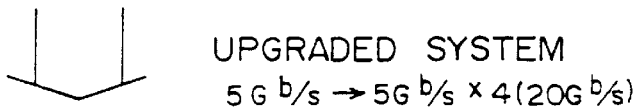
UPGRADED SYSTEM
5G b/s → 5G b/s × 4 (20G b/s)
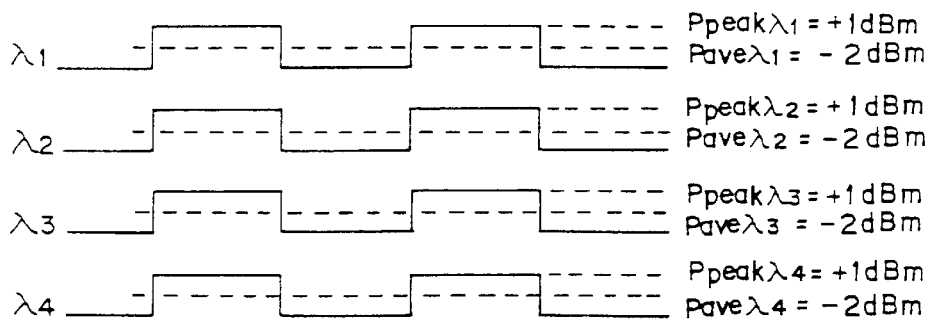
$P_{ave} = P_{ave\lambda_1} + P_{ave\lambda_2} + P_{ave\lambda_3} + P_{ave\lambda_4}$
$= +4 dBm$
UPGRADED SYSTEM (5G b/s × 4 WAVES, OUTPUT OF + 4 dBm (AS AVERAGE POWER), NRZ)
FIG. 11B

NRZ MODE

RZ MODE

RZ

NRZ

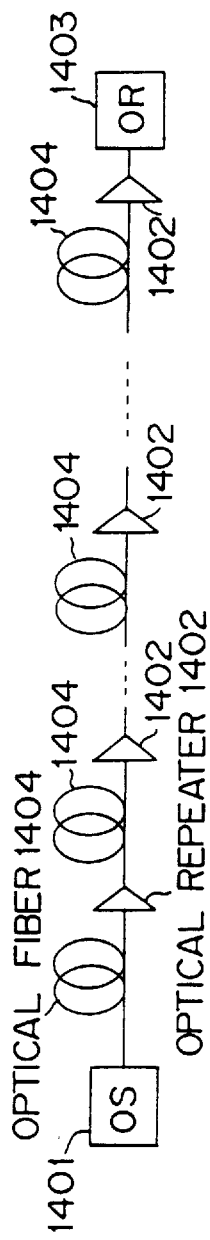
FIG. 14A
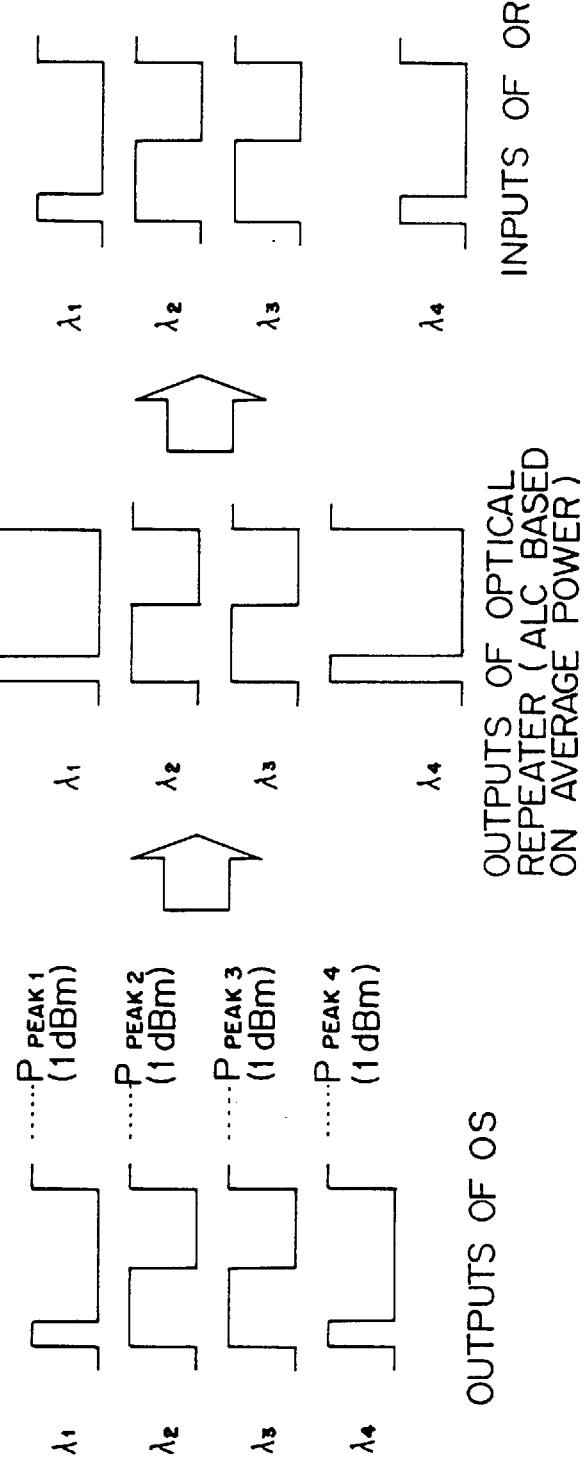
FIG. 14B
FIG. 14C
FIG. 14D

WAVELENGTH-MULTIPLEXING OPTICAL COMMUNICATION METHOD EMPLOYING RZ SIGNALS, WAVELENGTH-MULTIPLEXING OPTICAL SENDING APPARATUS EMPLOYING RZ SIGNALS, AND WAVELENGTH-MULTIPLEXING OPTICAL COMMUNICATION SYSTEM EMPLOYING RZ SIGNALS

BACKGROUND OF THE INVENTION

1. Field of the Invention

The present invention relates to wavelength-multiplexing optical communication technology for transmitting the data of a plurality of channels over a single optical fiber by the use of a plurality of wavelengths.

2. Description of the Related Art

In recent years, there have been incarnated optical communication systems in each of which digital data are transmitted by performing optical amplification and optical relay or repeat with an optical fiber such as EDF (erbium-doped fiber). In the conventional system wherein signal light of only one wave is optically amplified and relayed, the digital data are transmitted by optimally managing dispersion in such a way that the transmission coding format of the system is set at the mode of an NRZ (non-return-to-zero) signal, and that a negative dispersion wavelength is employed using a DSF (dispersion shift fiber) as a transmission line. First, these basic techniques will be explained below.

As illustrated in FIG. 1, a zero-dispersion wavelength is inherent in an optical fiber. It is a wavelength at which the delay time of a signal becomes 0 (zero). In the DSF which is common as the optical fiber for transmitting signal light, the zero-dispersion wavelength is 1.5625 [$\mu$m]. That dispersion characteristic of the optical fiber which indicates the relationship of the delay time of the signal on this optical fiber to the wavelength of the signal light, exhibits a quadratic curve whose minimum value lies at the zero-dispersion wavelength as shown in FIG. 1. For the DSF, a wavelength on the order of 1.5585 [$\mu$m] shorter than the zero-dispersion wavelength is used as the signal light wavelength. In this case, the dispersion characteristic in the vicinity of the signal light wavelength becomes the negative one in which the delay time decreases with increase in the wavelength of the signal light and increases with decrease in the same. The dispersion value of the signal light involved here is −0.3 [psec/nm/km] (picosecond/nanometer/kilometer) or so at the signal light wavelength. That is, in a case where the signal light having the signal light wavelength mentioned above is transmitted 1000 [km] over the DSF, the signal light delays −300 [psec] on condition that the wavelength of the signal light has increased 1 [nm] from the specified signal light wavelength.

Meanwhile, in a case where signal light obtained by directly modulating a digital signal as shown in FIG. 2 is transmitted over an optical fiber, the signal light is not always transmitted at the signal light wavelength thereof, but it is transmitted with a predetermined dispersion centering on the signal light wavelength as illustrated in FIG. 3.

Accordingly, when the signal light is transmitted centering on the signal light wavelength as stated above, over the optical fiber such as DSF, the arrival rates of light come to differ at the respective components of wavelengths which constitute the signal light centering on the signal light wavelength. Consequently, degradations in the signal light, such as a dull or blunt waveform, occur on a reception side for receiving the transmitted signal light.

In order to transmit the signal light without any delay, theoretically the signal light may be transmitted at the zero-dispersion wavelength of the optical fiber. The DSF, however, has the property that noise is maximized at the zero-dispersion wavelength by 4-light wave mixing or multiplexing or by a nonlinear effect called the "optical parametric effect". It also has the property that noise is abruptly amplified at a positive dispersion wavelength by a nonlinear effect called the "modulation instability". Therefore, the signal light is ordinarily transmitted at a negative dispersion wavelength.

In this regard, a technique called the "dispersion management" has heretofore been employed for compensating for the signal delay at the negative dispersion wavelength. The dispersion management is the technique in which a DCF (dispersion compensation fiber) being a single-mode fiber is inserted every fixed length of the DSF, whereby the delay time is compensated for so as to become 0 (zero) within a predetermined wavelength range centering on the signal light wavelength as illustrated in FIG. 4.

More concretely, referring to FIG. 5, the signal light has the spread of wavelengths as denoted by mark (*) at and near the signal light wavelength on the DSF. In this case, as stated before, the zero-dispersion wavelength of the DSF is 1.5625 [$\mu$m], and the signal light wavelength is on the order of 1.5585 [$\mu$m], so that the dispersion characteristic which indicates the relationship of the delay time of the signal to the wavelength of the signal light becomes the negative one. On the other hand, the zero-dispersion wavelength of the DCF is on the order of 1.31 [$\mu$m], and the specified signal light wavelength 1.5585 [$\mu$m] is longer than this zero-dispersion wavelength 1.31 [$\mu$m] of the DCF. As illustrated in FIG. 5, therefore, the dispersion characteristic of the DCF at the particular signal light wavelength becomes the positive one in which the delay time increases with increase in the wavelength of the signal light and decreases with decrease in the same. Owing to the insertion of the DCF every fixed length of the DSF, accordingly, the negative dispersion characteristic based on the DSF is cancelled by the positive dispersion characteristic based on the DCF, and the compensation for zeroizing the delay time is realized in the predetermined wavelength range centering on the signal light wavelength. In this case, the dispersion value of the signal light at and near the particular signal light wavelength on the DSF is approximately −0.3 [psec/nm/km], while the dispersion value of the signal light at and near the particular signal light wavelength on the DCF is approximately +20 [psec/nm/km]. Therefore, the length of the DCF to be inserted may be short as compared with that of the DSF.

On the ground of the optical amplification/relay technique explained above, a wavelength multiplexing system wherein the digital data of a plurality of channels are transmitted with a plurality of wavelengths over a single optical fiber is recently intended for practical use due to an increased data transmission capacity, in such a way that only the construction of each terminal station is altered with the existing transmission line diverted, by utilizing a bit-rate-free property which is one of the advantages of the optical amplification/relay system.

In incarnating the wavelength-multiplexing transmission system on the existing transmission line, however, problems to be explained below are involved:

Problem 1

Problem ascribable to Cross Phase Modulation

First, in general, in a case where one sort of signal light is transmitted over an optical fiber, there is an effect called the "self phase modulation" in which the intensity change of the signal light itself incurs the phase change or shift of its own signal light, resulting in an enlarged dispersion at the set wavelength of the signal light. The dispersion ascribable to this effect can be compensated for by the optimal dispersion management stated before.

Further, it is known that an effect called the "cross phase modulation" appears in a case where a plurality of signal light waves or beams having respectively different wavelengths are subjected to wavelength multiplexing transmission. Now, in case of subjecting signal light of wavelength λ1 and signal light of wavelength λ2 to the multiplexing transmission as illustrated in FIG. 6A, the transmission rates of the two signal light waves within an optical fiber are different, and hence, the phases thereof ordinarily fail to synchronize. In this case, as illustrated in FIG. 6B, the cross phase modulation appears in which the intensity change of the signal light of the wavelength λ2 incurs the phase change of the signal light of the wavelength λ1, whereas the intensity change of the signal light of the wavelength λ1 incurs the phase change of the signal light of the wavelength λ2. As a result, the spectrum of the two signal light waves at the reception thereof becomes as shown in FIG. 6C. Herein, the received spectrum spreads or widens as compared with the spectrum of the signal light waves at the sending thereof as shown in FIG. 6A, so that the waveforms of the signal light waves degrade. The effect of the cross phase modulation arises especially conspicuously in the wavelength multiplexing transmission employing NRZ signals as to which signal components of identical level overlap at a high probability between the plurality of signal light waves.

Accordingly, how Problem 1 stated above is overcome forms a theme in the case of incarnating the wavelength-multiplexing transmission system on the existing transmission line.

Problem 2

Problem concerning Preemphasis

In the case of the wavelength multiplexing transmission, differences in transmission characteristics are caused among the transmitted signal light waves of individual channels by the effect of self filtering in which the gains of the signal light waves depend upon the wavelengths thereof in an optical repeater. Now, let's consider an optical communication system as shown in FIG. 7A, which includes an optical sender (OS) 701, optical repeaters 702, an optical receiver (OR) 703 and optical fibers 704. With this system, in a case where the plurality of signal light waves having an identical level and different wavelengths among the individual channels as shown by a sending spectrum in FIG. 7B have been sent from the optical sender 701, noise components hatched in a spectrum as shown in FIG. 7C are superposed in the course in which the signal light waves are transmitted through the optical fibers 704 as well as the optical repeaters 702. Simultaneously, the signal light waves undergo the self filtering effect mentioned above. For these reasons, the levels of the received signal light waves of the respective channels differ in the optical receiver 703 as shown by a spectrum in FIG. 7D.

Known as a technique for solving such a problem is so-called "preemphasis" in which a plurality of signal light waves or beams of different wavelengths are sent by endowing the signals with different optical levels beforehand in order that the optical levels of the signals at the time of reception may be uniformalized. More specifically, in an optical communication system as shown in FIG. 8A, which is the same as the system shown in FIG. 7A, the plurality of signal light waves endowed with different optical levels and having different wavelengths among individual channels as shown by a sending spectrum in FIG. 8B are sent from the optical sender 701. Thus, the spectrum of the sent signal light waves changes as shown in FIG. 8C, in the course in which they are transmitted through the optical fibers 704 as well as the optical repeaters 702. It turns out that the levels of the received signal light waves of the respective channels become uniform in the optical receiver 703 as seen from FIG. 8D.

However, in the case where the preemphasis explained above is applied to the prior-art wavelength multiplexing transmission employing the NRZ signals, naturally the optical output of the optical sender 701 has its upper limit, and hence, the output power of the optical sender 701 must be lowered for some signal wavelengths with the intention of uniformalizing the optical levels of the transmitted signals at all the signal wavelengths. Now, let it be supposed that four sorts of signal light waves or beams having wavelengths λ1, λ2, λ3 and λ4, respectively, are multiplexed and transmitted in an optical communication system as shown in FIG. 9A, which is the same as the system shown in FIG. 7A. Here, in a case where the preemphasis explained before is not applied, the peak power ($P_{PEAK}$) of each of the signal light waves is set at, for example, +1 [dBm] in the optical sender 701. In this case, however, the levels of the signal light waves of, for example, the wavelengths λ1 and λ4 decrease in the optical receiver 703 as illustrated in FIG. 9B, so that the SNR's (signal-to-noise ratios) of these signal light waves degrade. On the other hand, in a case where the preemphasis explained before is applied, the peak power of each of the signal light waves of, for example, the wavelengths λ2 and λ3 is set at, for example, +0.5 [dBm] in the optical sender 701 as illustrated in FIG. 9C. As a result, the levels of all the signal light waves of the wavelengths λ1~λ4 are uniformalized in the optical receiver 703 as illustrated in FIG. 9C, but these levels are low. Consequently, the differences between the essential levels of the respective signal light waves and the noise levels thereof become small in all the signal light waves of the wavelengths λ1~λ4, and the SNR's (signal-to-noise ratios) of all the signal light waves degrade.

Problem 3

Problems ascribable to Narrowed Wavelength Intervals

Regarding Problem 2 mentioned above, the self filtering effect explained before becomes more conspicuous as a service wavelength band used is wider. For this reason, by way of example, the service wavelength band needs to be narrowed from 4.0 [nm] shown in FIG. 10A, to 2.0 [nm] shown in FIG. 10B. Thus, the self filtering effect can be weakened to some extent, and the degradation of the SNR of each signal light can be suppressed in spite of the application of the preemphasis explained before.

However, when the service wavelength band is narrowed, the influence of the nonlinear effect of the optical fibers increases this time, to pose the problem that the transmission characteristic of the signal light degrades drastically.

As another problem, optical filters of narrow bands must be used in the optical receiver in order to suppress the crosstalk between proximate wavelengths. This necessitates the developments of new techniques, such as the development of a wavelength follow-up type filter which can cope with the fluctuation of the signal light wavelength with the lapse of time, and the development of a wavelength fixing technique for the optical sender.

Problem 4

Problem ascribable to Ageing of System or Insertional Laying Repair of Cable

It has hitherto been known that the increase of a span loss, the output lowering of an optical repeater, etc. arise due to the ageing of an optical communication system, the insertional laying repair of an optical fiber cable, or the like, so the transmission characteristic of signal light degrades. It is therefore necessary to consider margins for the ageing, the insertional cable laying repair, etc. at the stage of designing the optical communication system. The margins form one of factors for limiting the relaying or repeating intervals of the optical fibers.

Problem 5

Problem of Degradation of SNR attributed to Wavelength Multiplexing

In the case where, as referred to in the explanation of Problem 2, the existing optical communication system already installed is upgraded by the wavelength multiplexing system, an ALC (automatic level control) is ordinarily performed on the basis of average power in an optical repeater included particularly in a submarine repeating system or the like, and hence, the output power of the optical repeater becomes constant. In the submarine repeating system or the like including such an optical repeater, accordingly, the output of the optical repeater cannot be easily altered, so that signal light waves need to be transmitted after lowering the average power of light per wave in accordance with the number of wavelengths to-be-multiplexed. By way of example, the existing optical communication system is assumed to be one wherein, as illustrated in FIG. 11A, a digital signal having a transmission rate of 5 [Gb/s] (gigabits/second) is transmitted by signal light of single wave having a peak power ($P_{peak}$) value of +7 [dBm] and an average power ($P_{ave}$) value of +4 [dBm], in accordance with the transmission coding format of the NRZ signal. With this optical communication system, in a case where, as illustrated in FIG. 11B, four sorts of digital signals each having a transmission rate of 5 [Gb/s] are subjected to wavelength multiplexing transmission by signal light beams of four waves in accordance with the transmission coding format of the NRZ signal, the signal light per wave needs to have its peak power suppressed to +1 [dBm] and its average power to −2 [dBm] in order that the total average power of the four waves may become +4 [dBm].

The suppressive settings result in the problem that the SNR per wave degrades, so a required transmission characteristic cannot be ensured.

As a technique for solving Problem 1 among the aforementioned problems, there has been proposed a transmission system called the "soliton transmission system". According to this transmission system, with note taken of the fact that a domain less liable to noise and to dispersion is existent in the positive dispersion wavelength region of an optical fiber, signal light is transmitted at a positive dispersion wavelength, and an RZ (return-to-zero) signal is employed as the transmission coding format of the signal light.

As compared with the NRZ signal, the RZ signal becomes higher in the effective transmission rate of the signal light and therefore requires communication equipment of higher performance. For this reason, the NRZ signals are utilized in the conventional optical communication systems. In recent years, however, equipment of high performance have come to be easily offered, and hence, the utilization of the RZ signals is becoming possible.

As stated before, in the case where the NRZ signals are used for the wavelength multiplexing transmission, the probability at which the signal components of identical level overlap among the plurality of signal light waves is high as illustrated in FIG. 12A, and hence, the cross phase modulation effect appears conspicuously. On the other hand, in the case where the RZ signals are used for the wavelength multiplexing transmission, the probability at which the signal components of identical level overlap among the plurality of signal light waves lowers as illustrated in FIG. 12B, and hence, the cross phase modulation effect can be suppressed. Besides, with the NRZ signals, as seen from an eye pattern depicted in FIG. 13A, an eye becomes small in area due to the presence of parts where logical level "1" succeeds, so that an inter-code interference is prone to occur. In contrast, with the RZ signals, as seen from an eye pattern depicted in FIG. 13B, an eye is of large area owing to the absence of the parts where the logical level "1" succeeds, so that the inter-code interference is less prone to occur as the feature of the RZ mode. The soliton transmission system is the system wherein the signal light waves modulated directly by the RZ signals having such properties are transmitted at the positive dispersion wavelengths.

With the soliton transmission system stated above, however, the existing optical fibers cannot be diverted, so that all the optical fibers in the conventional optical communication system need to be exchanged. This gives rise to the problem that the installation of the optical communication system conforming to the proposed system requires a high cost.

SUMMARY OF THE INVENTION

This invention has been made with the above background, and has for its object to simultaneously solve all of the problem ascribable to the cross phase modulation, the problem concerning the preemphasis (including the problems ascribable to the wavelength intervals), the problem ascribable to the ageing of the system or the insertional laying repair of the cable, and the problem of the degradation of the SNR attributed to the wavelength multiplexing.

The present invention is premised on a wavelength-multiplexing optical communication method wherein the data of a plurality of channels are transmitted using signal light waves or beams of a plurality of wavelengths over a single optical fiber, or an apparatus or a system which has a function equivalent to that of the optical communication method.

In the first aspect of the present invention, the transmission coding format of each of the signal light waves is set to be a return-to-zero mode, and the duty factor of each of the signal light waves is allowed to vary, thereby to allow variation in the transmission characteristic of each of the signal light waves.

Owing to the above construction of the first aspect of the present invention, the cross phase modulation effect can be suppressed, while at the same time, the transmission characteristic of each signal light can be varied without altering the average power thereof, in such a way that merely the terminal equipment of a system is altered without exchanging the existing optical fibers or optical repeaters thereof.

In the second aspect of the present invention, the transmission coding format of each of the signal light waves is set to be a return-to-zero mode, and the power level and duty factor of each of the signal light waves are allowed to vary, whereby the transmission characteristic of each of the signal light waves can be varied.

Owing to the above construction of the second aspect of the present invention, the preciser variation of the transmission characteristic becomes possible in addition to the features of the first aspect of the present invention.

In the third aspect of the present invention, the transmission coding format of each of the signal light waves is set to be a return-to-zero mode, and the duty factor of each of the signal light waves is allowed to vary, whereby the preemphasis of each of the signal light waves can be performed.

Owing to the above construction of the third aspect of the present invention, the preemphasis of each of the signal light waves can be performed without altering the average power thereof, merely by varying the duty factor thereof, so that an optical communication of excellent SNR characteristic is realized.

Moreover, since a service wavelength band for use need not be narrowed, the influence of the nonlinear effect of the optical fiber attributed to a narrowed service wavelength band does not increase, and a wavelength follow-up type optical filter of narrow band need not be assembled in the optical receiver of a system, either.

In the fourth aspect of the present invention, the transmission coding format of each of the signal light waves is set to be a return-to-zero mode, and the power level and duty factor of each of the signal light waves are allowed to vary, whereby the preemphasis of each of the signal light waves can be performed.

Owing to the above construction of the fourth aspect of the present invention, the preciser preemphasis of each of the signal light waves becomes possible in addition to the feature of the third aspect of the present invention.

In the fifth aspect of the present invention, the transmission coding format of each of the signal light waves is set to be a return-to-zero mode, and the duty factor of each of the signal light waves is allowed to vary, whereby ageing in the transmission characteristic of each of the signal light waves or degradation in the transmission characteristic attributed to an insertional cable laying repair can be compensated for.

Owing to the above construction of the fifth aspect of the present invention, the lowering of the level of each of the signal light waves attributed to the insertional laying repair of the optical fiber cable, the lowering of the output of the optical repeater of an optical communication system attributed to the ageing of the system, etc. can be coped with merely by allowing the duty factor of each of the signal light waves to vary.

In the sixth aspect of the present invention, in case of upgrading an existing optical communication system, the transmission coding format of each of the signal light waves is set to be a return-to-zero mode, and the duty factor of each of the signal light waves is allowed to vary in accordance with the number of said signal light waves to-be-wavelength-multiplexed, whereby the transmission characteristic of said each signal light wave is allowed to be adjusted.

Owing to the above construction of the sixth aspect of the present invention, the existing optical communication system can be upgraded merely by allowing the duty factor of the signal light to vary.

As described above, according to the present invention, the signal light coded by the transmission coding format of the return-to-zero mode is employed, whereby the suppression of the cross phase modulation effect becomes possible.

BRIEF DESCRIPTION OF THE DRAWINGS

Other objects and features of the present invention will be readily understood by those skilled in the art, from the description of the preferred embodiments of the invention taken in conjunction with the accompanying drawings, wherein:

FIGS. 6A through 6C are diagrams for elucidating the principle of cross phase modulation;

FIGS. 7A through 7D are diagrams showing a transmission characteristic in a wavelength multiplexing system;

FIGS. 8A through 8D are diagrams for elucidating the principle of preemphasis;

FIGS. 11A and 11B are diagrams for explaining a problem which is posed in case of upgrading a system;

FIGS. 14A through 14D are first diagrams for elucidating the principle of a preferred embodiment of the present invention;

DESCRIPTION OF THE PREFERRED EMBODIMENTS

Now, the preferred embodiments of the present invention will be described in detail with reference to the drawings.

FIGS. 14A through 14D~FIGS. 17A and 17B are principle elucidation diagrams showing the fundamentals of the preferred embodiments of the present invention. Let's consider an optical communication system which includes an optical sender (OS) 1401, optical repeaters 1402, an optical receiver (OR) 1403 and optical fibers 1404 as illustrated in FIG. 14A.

In the optical amplification/repeat or relay system for signal light waves or beams as based on a wavelength-multiplexing system in this preferred embodiment, it is premised that the mode of RZ (return-to-zero) signals is used as a transmission coding format, that the existing DSF's (dispersion shift fibers) are used as a transmission line, and that negative dispersion wavelengths are employed, thereby to execute the optimal dispersion management explained in conjunction with FIG. 1~FIG. 5.

Figure 1:
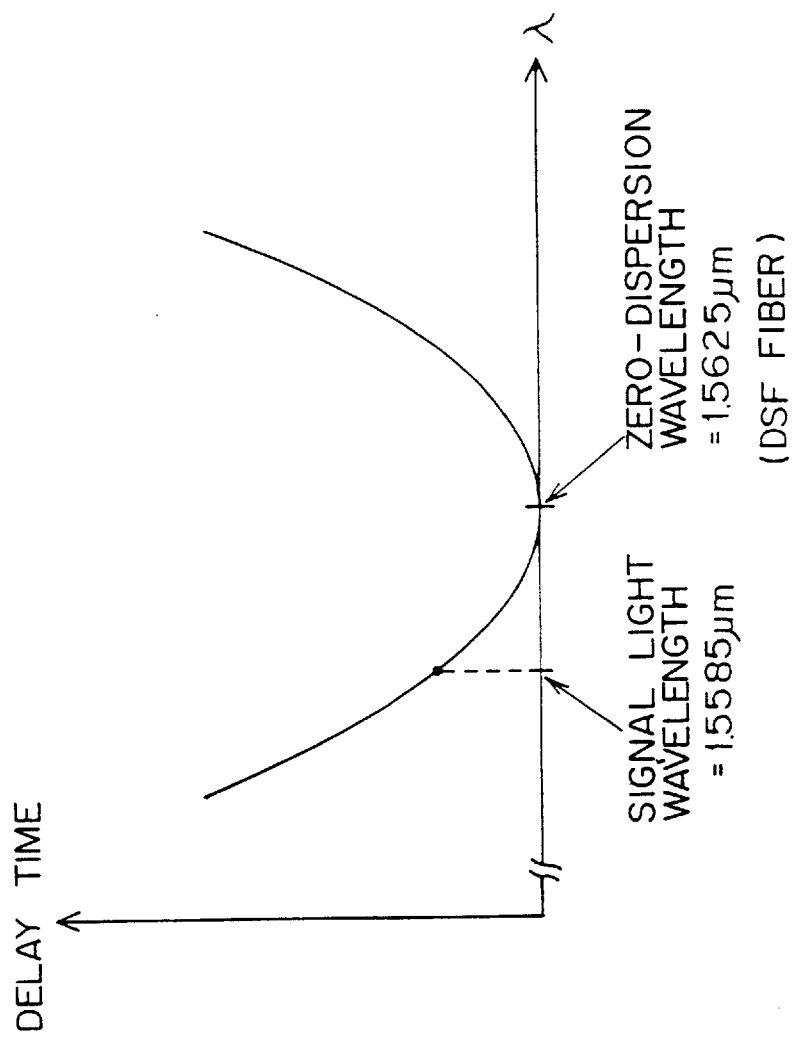
FIG. 1 is a graph for explaining a zero-dispersion wavelength and a signal light wavelength in a DSF (dispersion shift fiber)
Figure 2:
FIG. 2 is a diagram showing a digital signal.
Figure 3:
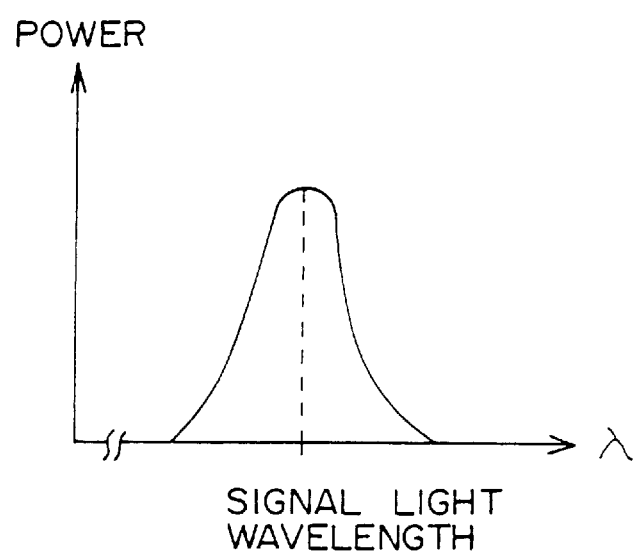
FIG. 3 is a graph showing the dispersion of the wavelength of signal light.
Figure 4:
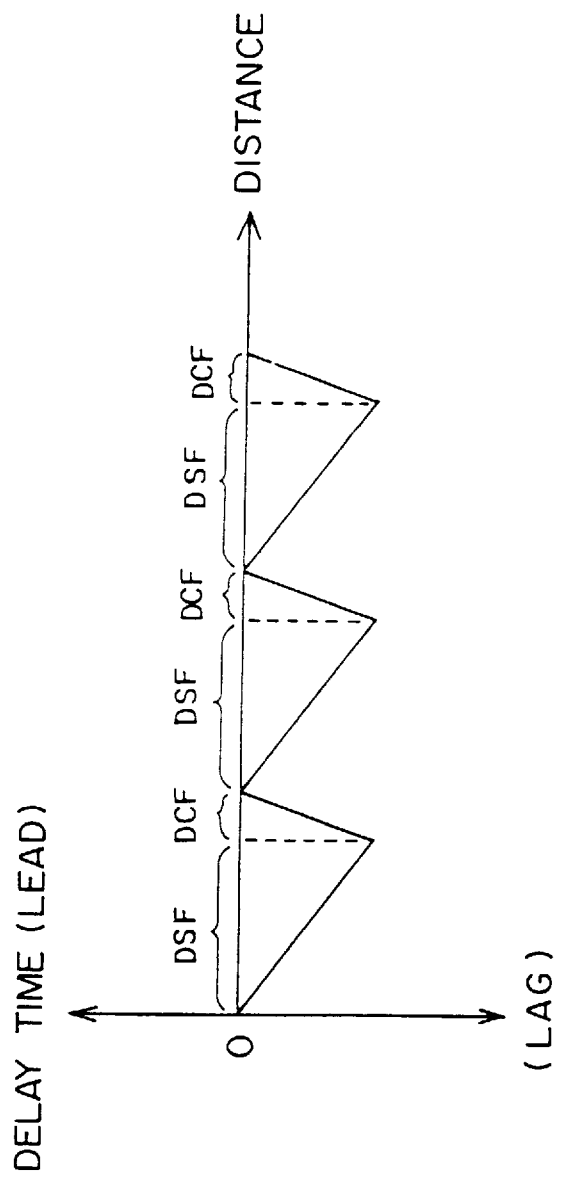
FIG. 4 is a first graph for explaining dispersion management.
Figure 5:
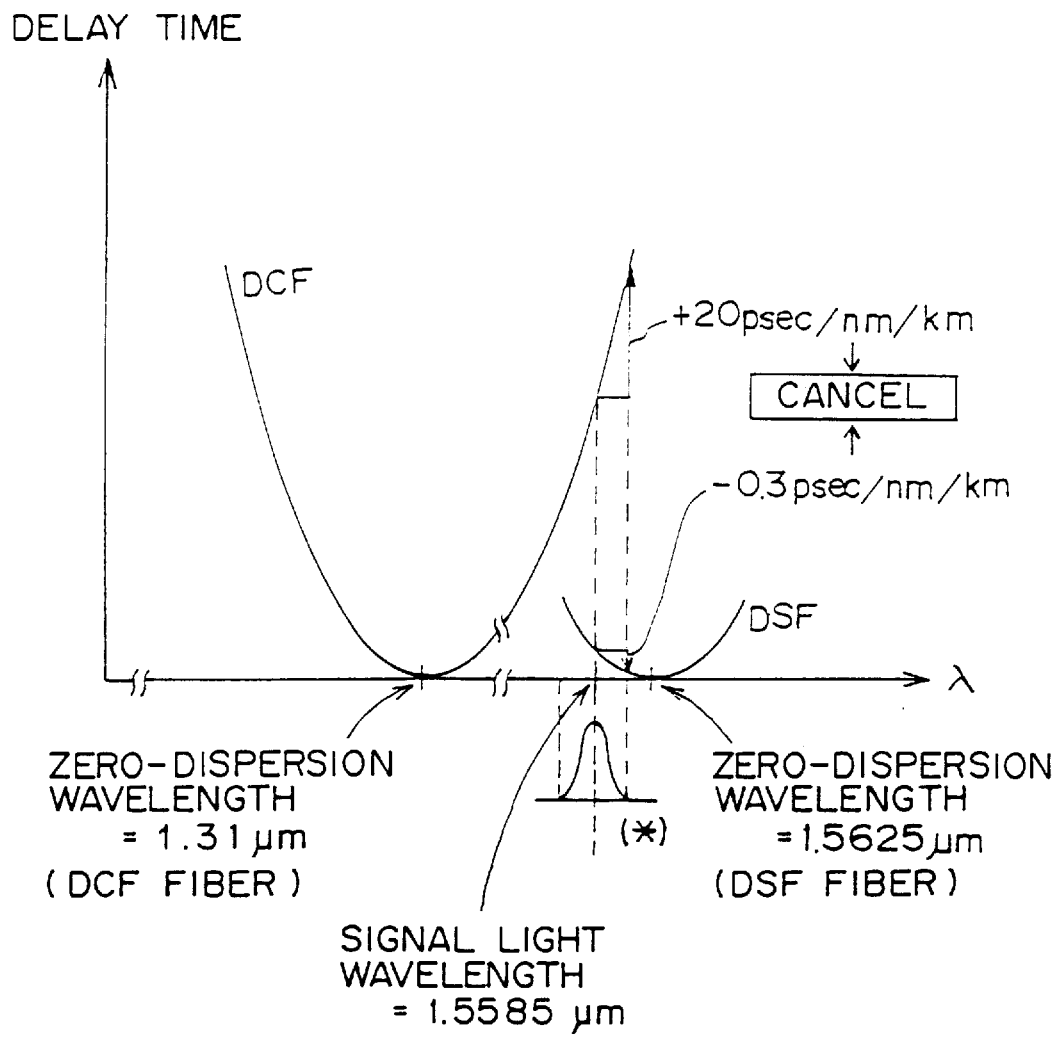
FIG. 5 is a second graph for explaining the dispersion management.
Figure 9A:
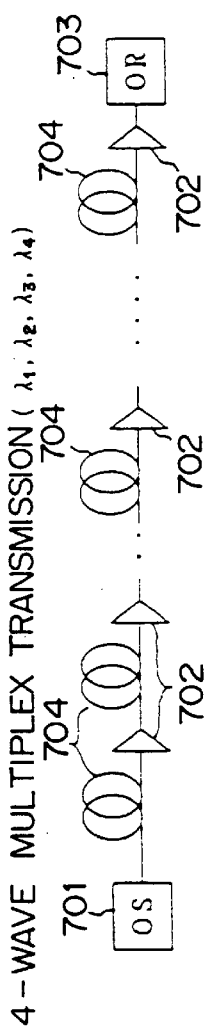
FIGS. 9A through 9C are diagrams for explaining the problem of the preemphasis attributed to power in a transmission coding format of NRZ (non-return-to-zero) mode.
Figure 9B:
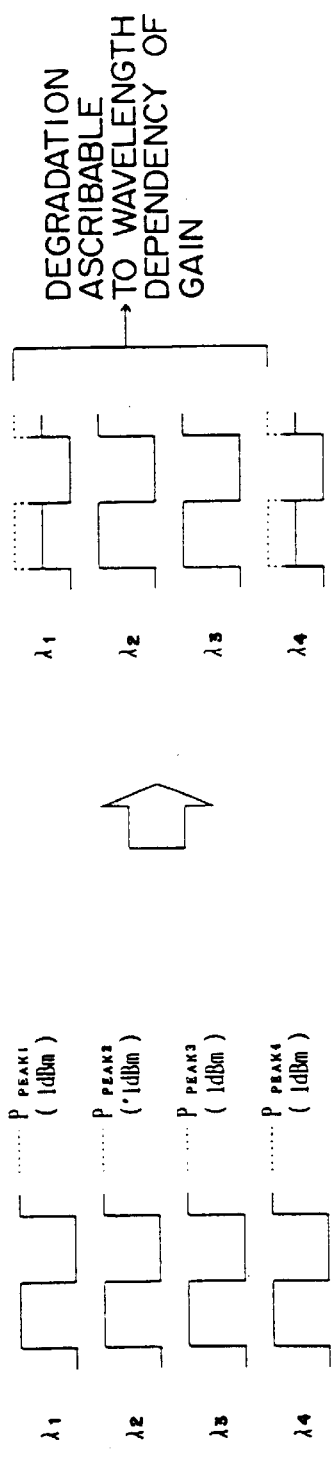
Figure 9C:
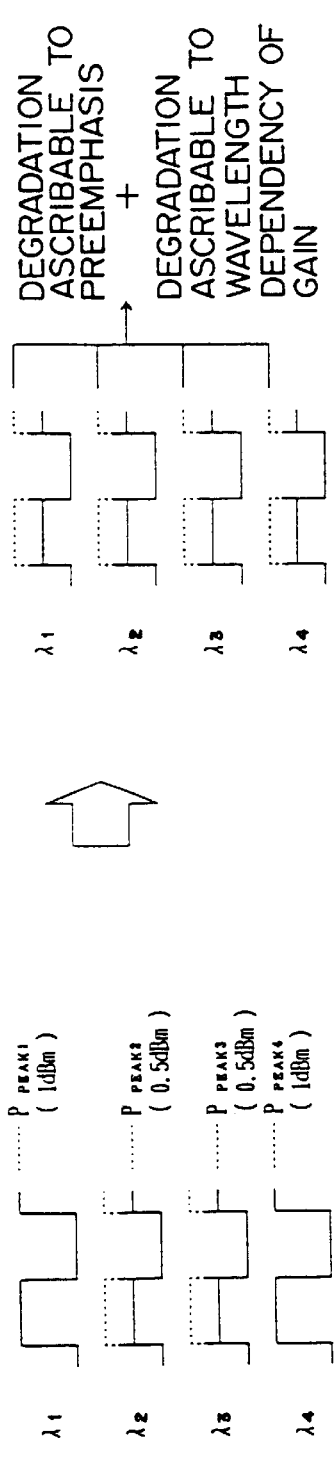
Figure 10A:
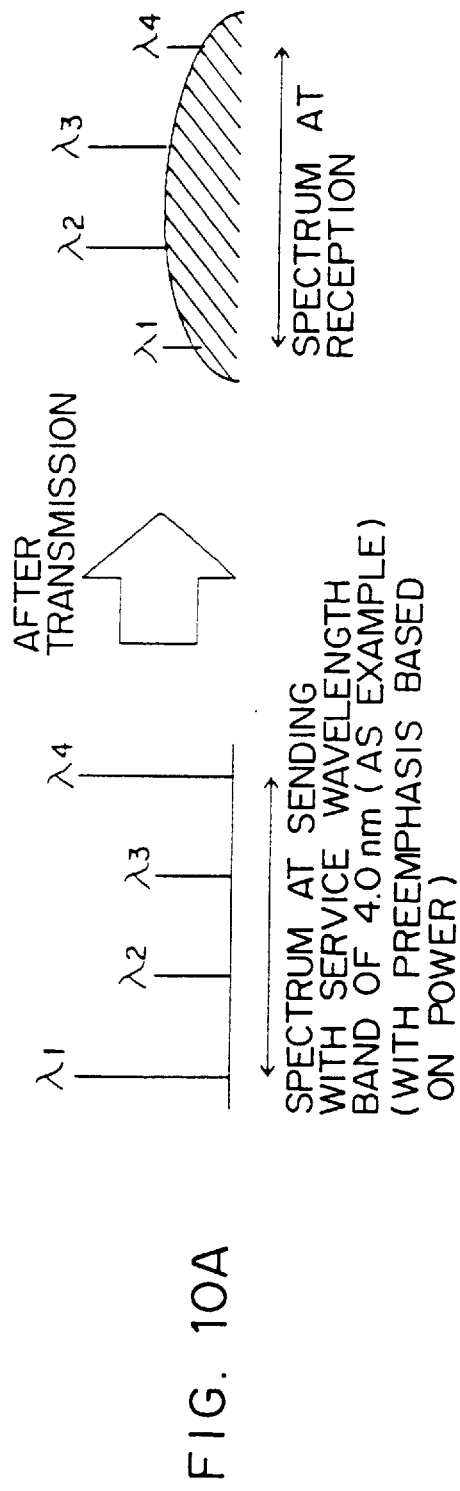
FIGS. 10A and 10B are diagrams for explaining a problem ascribable to narrowed wavelength intervals.
Figure 10B:
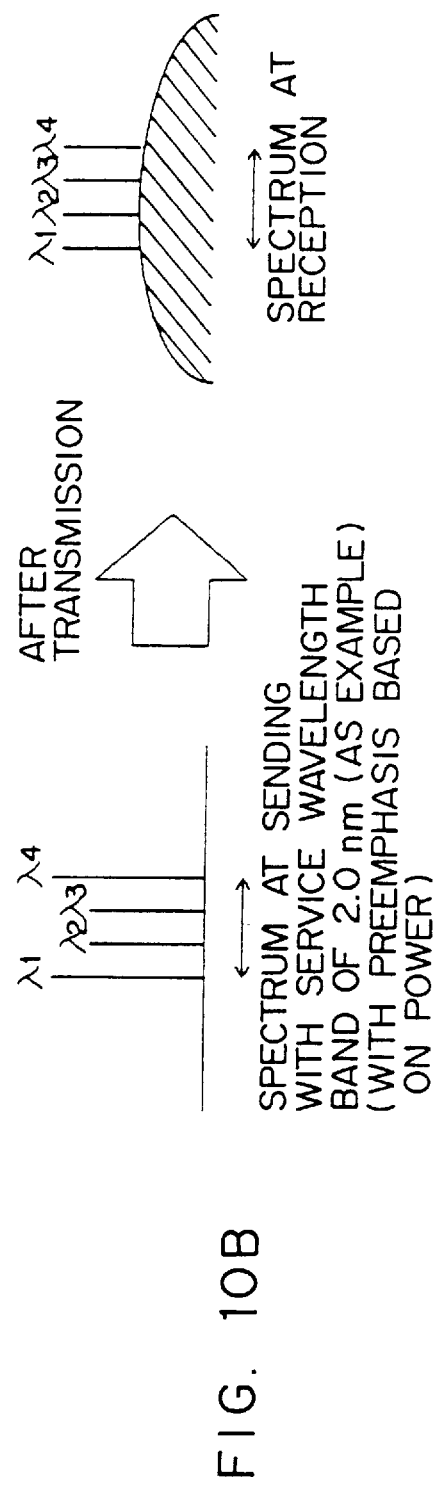
Figure 12A:
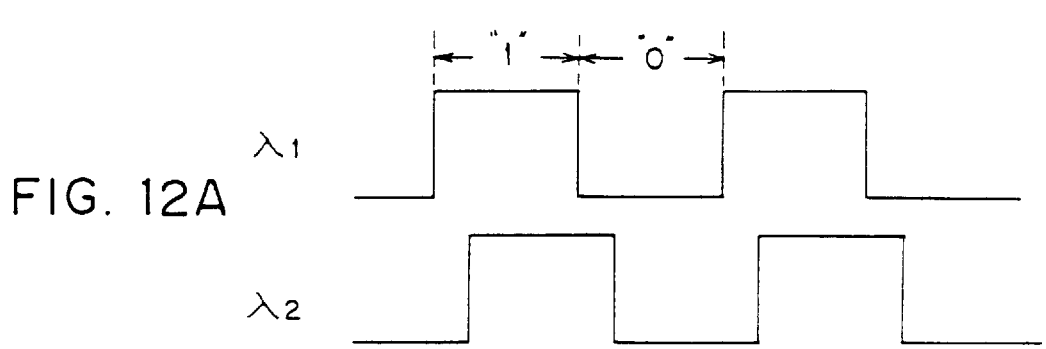
FIGS. 12A and 12B are first diagrams for explaining the advantage of a transmission coding format of RZ (return-to-zero) mode.
Figure 12B:
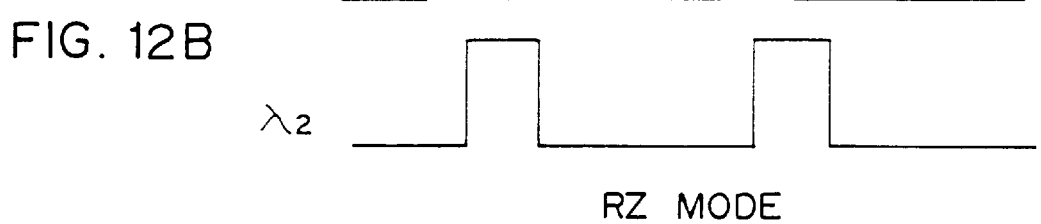
Figure 13B:
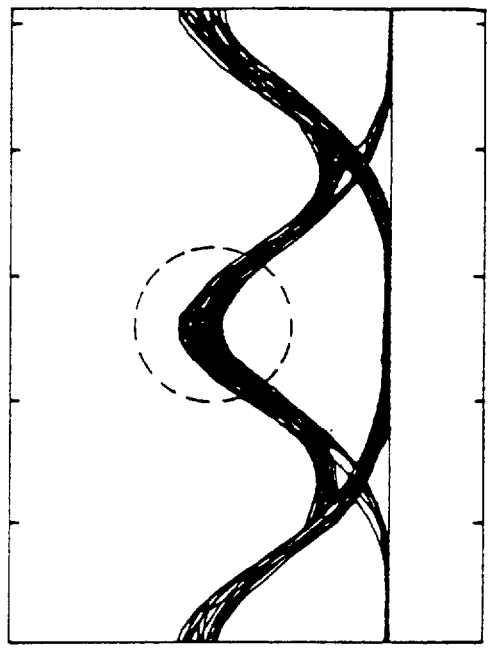
FIGS. 13A and 13B are second diagrams for explaining the advantage of the transmission coding format of RZ (return-to-zero) mode.
Figure 13A:
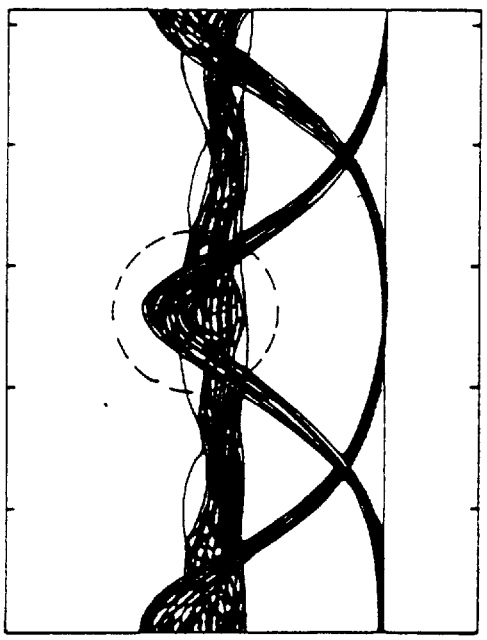

First, the adoption of the RZ signal mode realizes the suppression of the cross phase modulation effect owing to the fact that the probability at which the signal components of identical level overlap among the plurality of signal light waves lowers as stated before in conjunction with FIG. 12B.

Next, in this preferred embodiment, the existing submarine repeating system or the like is diverted. It is therefore premised that an ALC (automatic level control) is ordinarily executed on the basis of average power in the optical repeater 1402, and that the output power of the optical repeater 1402 is constant.

Besides, in this preferred embodiment, it is the most important feature that the duty factor of each signal is allowed to vary at a digital signal processing stage, whereby the average power of the signal light is controlled so as to become constant in the optical repeater 1402. As a result, the peak power of the signal light is allowed to vary.

In the first place, symbols $\lambda 1$, $\lambda 2$, $\lambda 3$ and $\lambda 4$ are let denote the respective wavelengths of the four sorts of signal light waves subjected to the wavelength multiplexing transmission over the optical fibers 1404 and received by the optical receiver 1403. Herein, a case is supposed where the preemphasis is not applied and where the levels of the signal light waves of the wavelengths $\lambda 1$ and $\lambda 4$ become lower than those of the signal light waves of the wavelengths $\lambda 2$ and $\lambda 3$ due to the self filtering effect in the optical repeater 1402 as stated before. In this case, as illustrated in FIG. 14B, the duty factors of the signal light waves of the wavelengths $\lambda 1$ and $\lambda 4$ are decreased at the digital signal processing stage in the optical sender 1401, and the peak power ($P_{PEAK}$) of each of the signal light waves is set at, for example, +1 [dBm].

Thereafter, the wavelength-multiplexed signal light of four waves delivered to the optical fiber 1404 is amplified and repeated while being subjected to the ALC in each optical repeater 1402 in order that the average power levels of the signal light waves may become constant. As a result, assuming that the self filtering effect does not appear, the peak power levels of the signal light waves of the wavelengths $\lambda 1$ and $\lambda 4$ become higher than those of the signal light waves of the wavelengths $\lambda 2$ and $\lambda 3$ as illustrated in FIG. 14C. When the self filtering effect has actually appeared, the difference between the peak power levels stated above is canceled by this effect. Thus, the peak power levels of the signal light waves of the wavelengths $\lambda 1$ and $\lambda 4$ and those of the signal light waves of the wavelengths $\lambda 2$ and $\lambda 3$ as are received by the optical receiver 1403 are uniformalized as illustrated in FIG. 14D.

Figure 15:
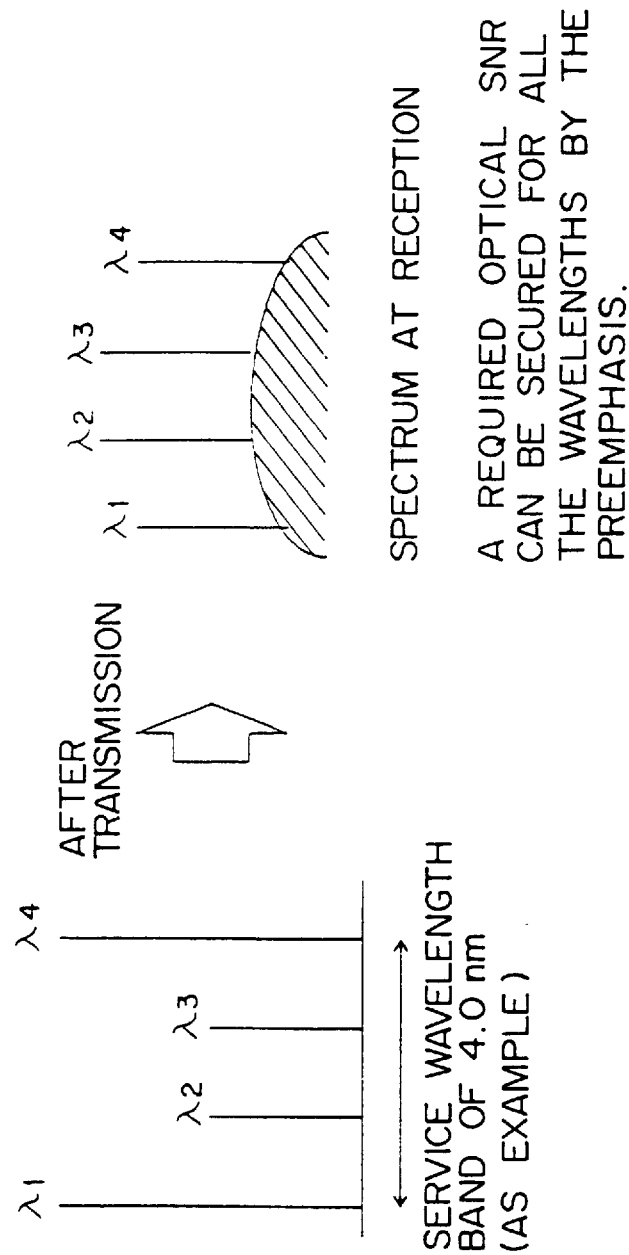
FIG. 15 is a second diagram for elucidating the principle of another preferred embodiment of the present invention.

As illustrated in FIG. 15, accordingly, degradations in the SNR's (signal-to-noise ratios) of the individual signals can be suppressed at the time of the reception of the signal light waves by the optical receiver 1403.

Moreover, a service wavelength band used need not be narrowed with respect to, for example, 4.0 [nm] shown in FIG. 15. Therefore, the influence of the nonlinear effect of the optical fiber attributed to a narrowed service wavelength band does not increase, and a wavelength follow-up type optical filter of narrow band need not be used in the optical receiver 1403, either.

Incidentally, even when the duty factor is varied, the timing of the corresponding signal does not shift, and hence, no problem is posed.

Owing to the above principles, Problems 1, 2 and 3 stated before are simultaneously solved.

Figure 16:
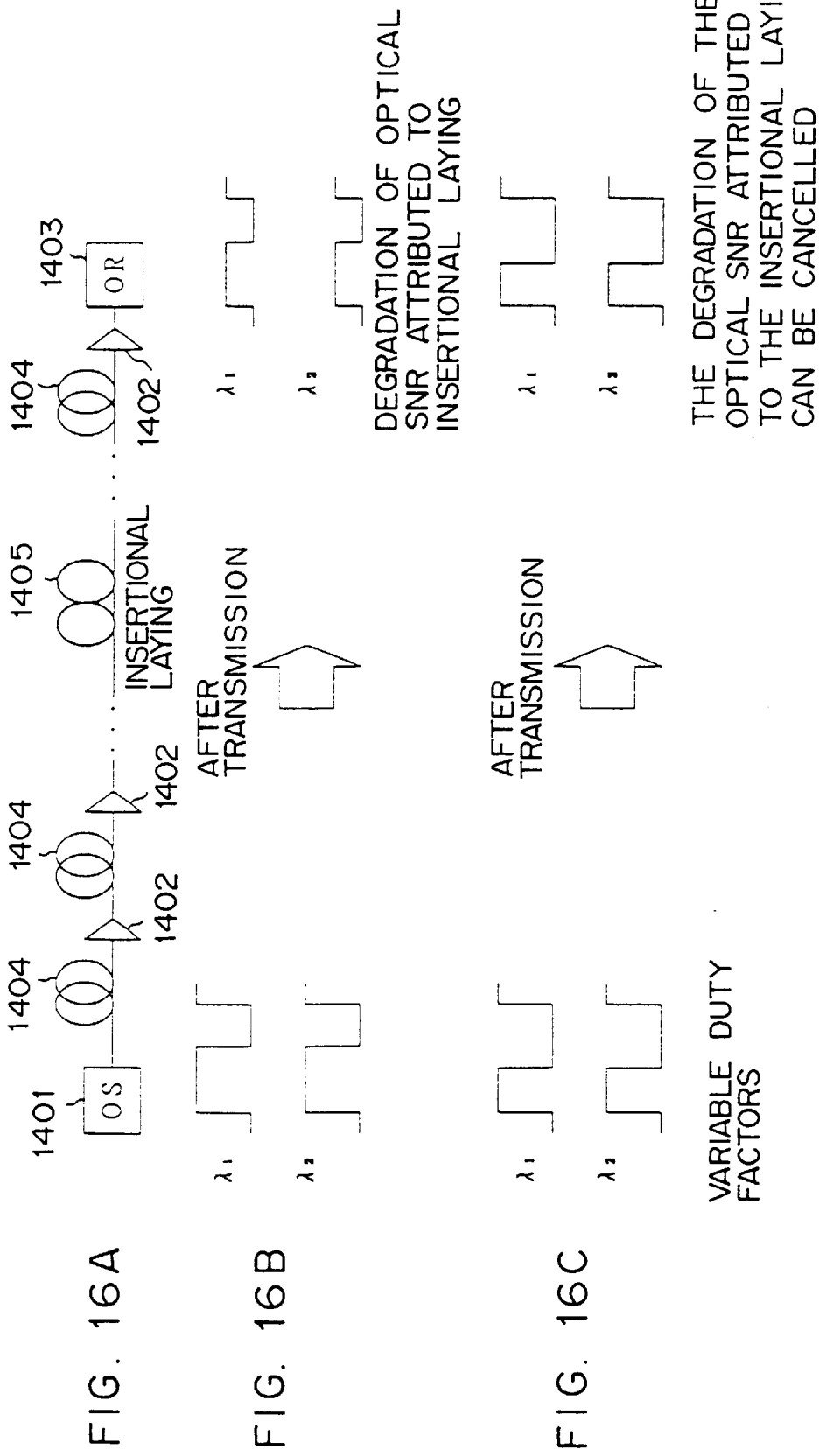
FIGS. 16A through 16C are third diagrams for elucidating the principle of still another preferred embodiment of the present invention.

Secondly, a case as illustrated in FIG. 16B is considered where the levels of signal light waves of, for example, wavelengths $\lambda 1$ and $\lambda 2$ subjected to the wavelength multiplexing transmission have lowered to degrade the SNR's thereof due to, for example, the insertional laying repair of an optical fiber cable (as indicated at numeral 1405 in FIG. 16A). In this case, as illustrated in FIG. 16C, the duty factors of both the signal light waves to be wavelength-multiplexed are decreased at the digital signal processing stage in the optical sender 1401.

Thereafter, the signal light waves delivered to the optical fiber 1404 is amplified and repeated while being subjected to the ALC in each optical repeater 1402 in order that the average power levels of the signal light waves may become constant. Thus, the increase of the peak power of each signal light wave attributed to the variation of the duty factor is canceled by the effect of level lowering ascribable to the insertional cable laying, and the lowering of the level of each signal light wave which is received by the optical receiver 1403 is suppressed as illustrated in FIG. 16C.

The principle described above is quite similarly applicable to the lowering of the output power of the optical repeater 1402 attributed to the ageing of the optical communication system, and so forth.

Owing to the above principle, Problem 4 stated before is solved.

Subsequently, let's consider a case where, as explained before, the existing optical communication system already installed is upgraded by the wavelength multiplexing system. In this case, on condition that the output power of the optical repeater 1402 cannot be altered with ease, the average power of signal light per wave needs to be lowered for transmission in accordance with the number of wavelengths to-be-multiplexed.

Figure 17:
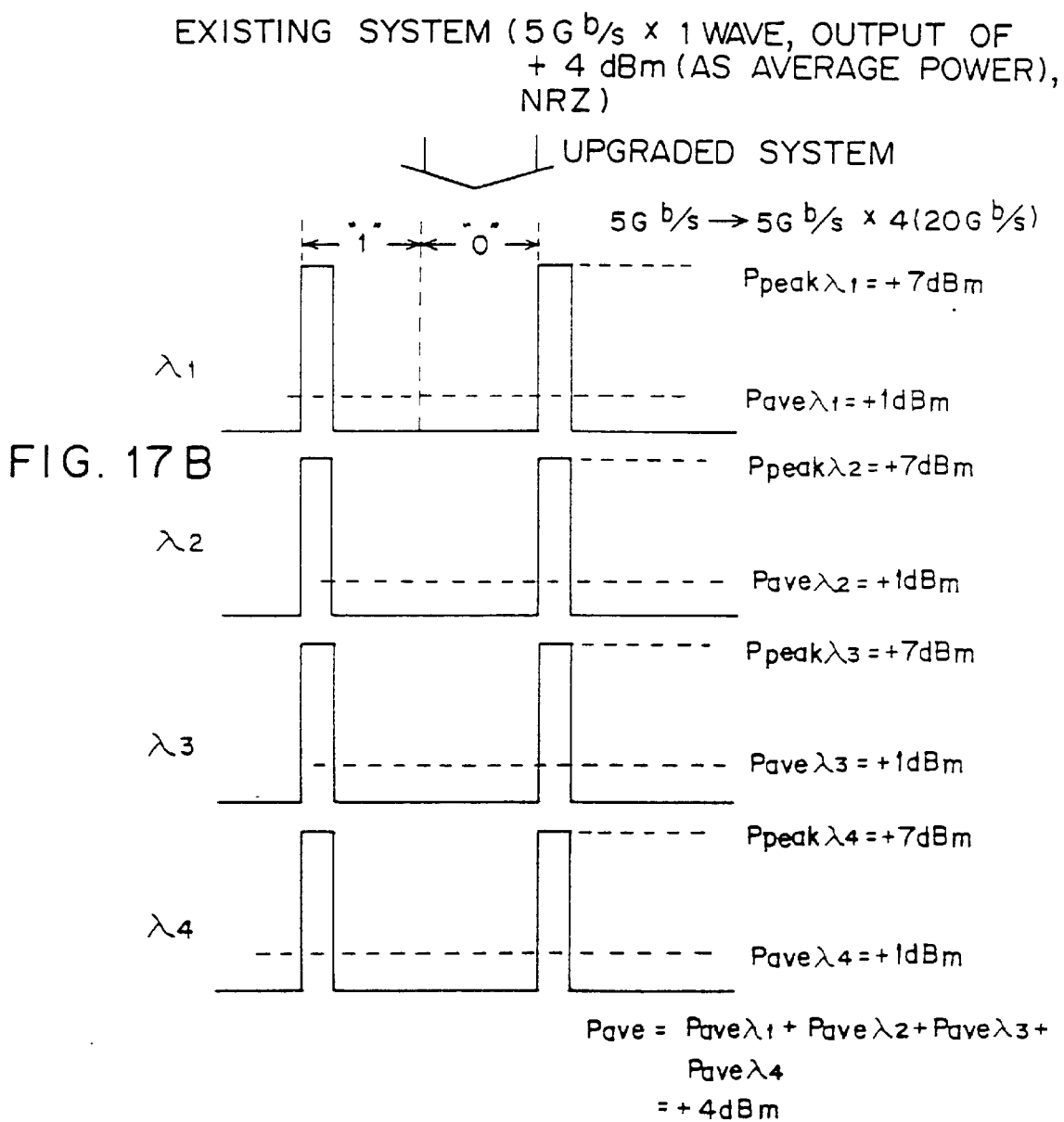
FIGS. 17A and 17B are fourth diagrams for elucidating the principle of yet another preferred embodiment of the present invention.

Here, by way of example, the existing optical communication system is assumed one wherein, as illustrated in FIG. 17A, a digital signal at a transmission rate of 5 [Gb/s] is transmitted in the form of signal light of single wave having a peak power level ($P_{peak}$) of +7 [dBm] and an average power level ($P_{ave}$) of +4 [dBm], in conformity with the transmission coding format of NRZ signal mode. On the other hand, an upgraded optical communication system is assumed one in which four sorts of digital signals each being at a transmission rate of 5 [Gb/s] are subjected to the wavelength-multiplexing transmission in the form of signal light beams of four waves. In this preferred embodiment, the transmission coding format is altered to the RZ signal mode, whereupon only the duty factor of each of the signal light waves is varied at the digital signal processing stage so that the average power per wave may become +1 [dBm] (+4 [dBm] as the total average power) and that the peak power may be maintained at +7 [dBm] (refer to FIG. 17B).

As a result, the lowering of the level of each signal light wave which is received by the optical receiver 1403 is suppressed, and the degradation of the transmission characteristic attributed to the degradation of the SNR is suppressed.

Owing to the above principle, Problem 5 stated before is solved.

As described above, in this preferred embodiment, the RZ signal mode is adopted as the transmission coding format, and the duty factor of each signal is allowed to vary at the digital signal processing stage, whereby the five problems explained before can be simultaneously solved.

Figure 18:
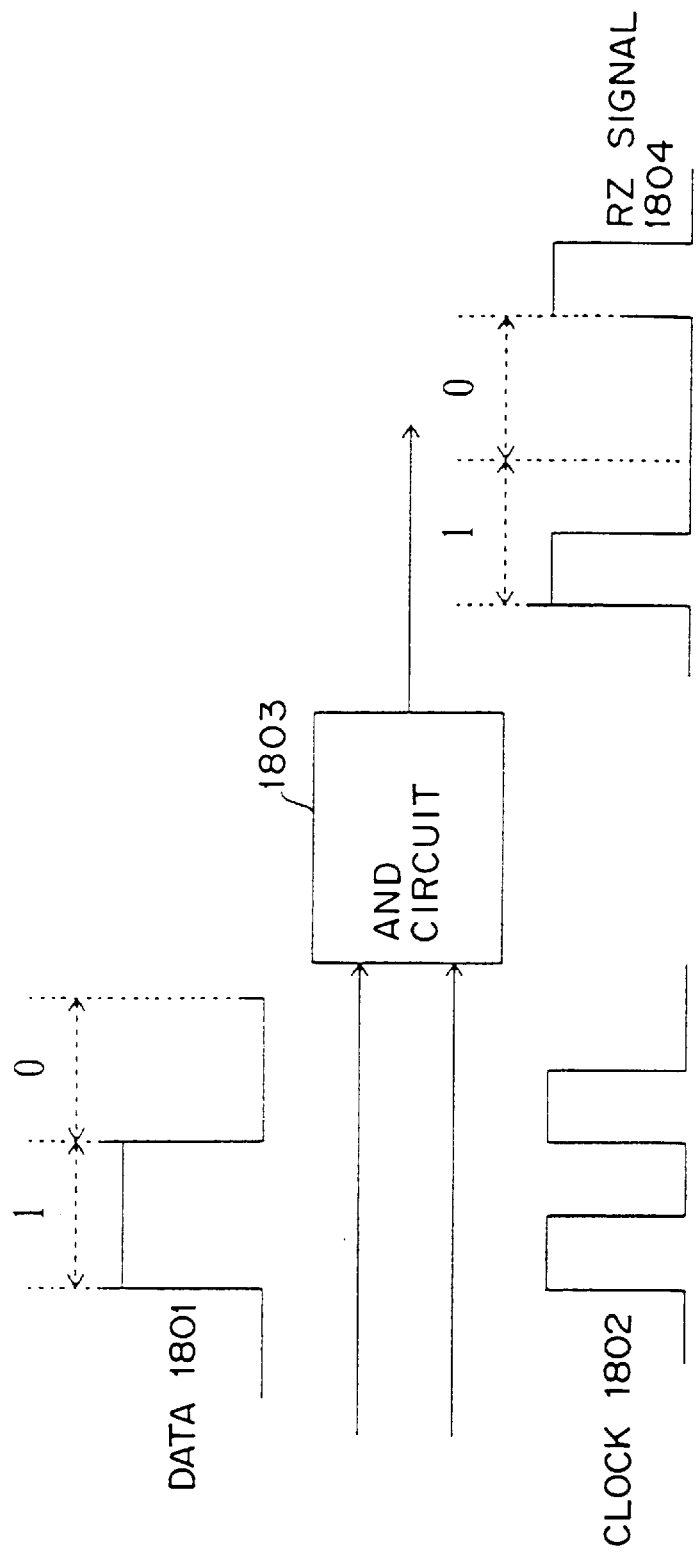
FIG. 18 is a schematic block diagram of an RZ signal generating circuit in a preferred embodiment of the present invention.

Next, FIG. 18 is a schematic block diagram of an RZ signal generating circuit in this preferred embodiment.

A clock signal 1802 for generating an RZ signal, and the data 1801 of a digital signal to be transmitted are input to an AND circuit 1803. Thus, the RZ signal 1804 corresponding to the data 1801 is output.

Figure 19:
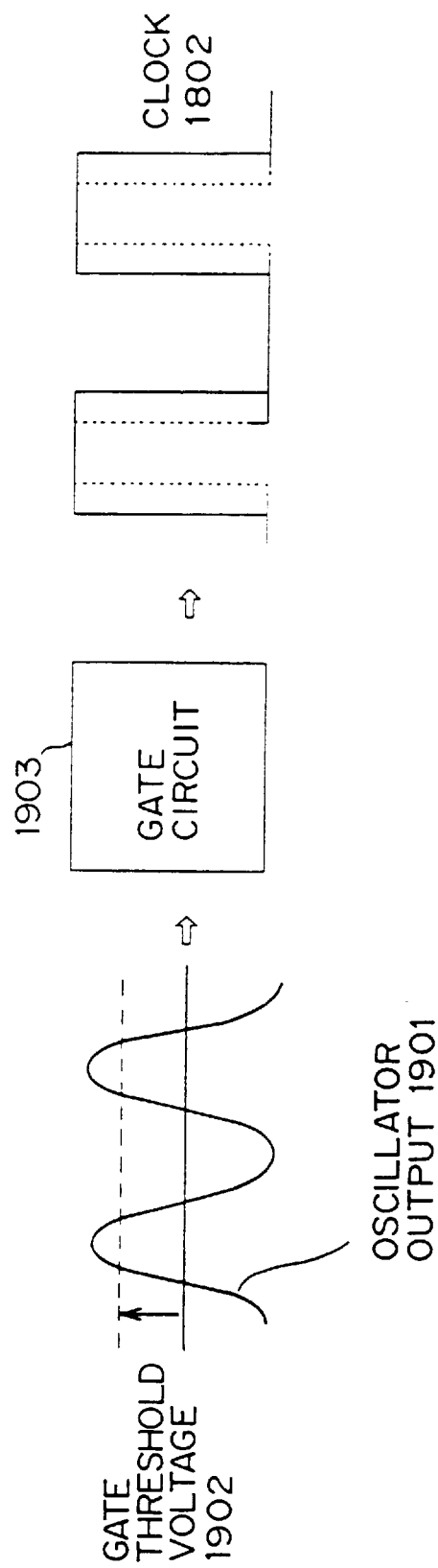
FIG. 19 is a schematic block diagram of a duty factor varying circuit in a preferred embodiment of the present invention.

FIG. 19 is a schematic block diagram of a duty factor varying circuit in this preferred embodiment.

This circuit is incarnated as a circuit for varying the duty factor of the clock signal 1802 which is to be input to the AND circuit 1803 in FIG. 18.

The clock signal 1802 is generated in such a way that an oscillator output 1901 of analog signal from an oscillator, not especially shown, is subjected to gate processing in a gate circuit 1903. In this case, a gate threshold voltage 1902 for generating the logical value "1" and logical value "0" of the clock signal 1802 is varied in the gate circuit 1903, whereby the duty factor of the clock signal 1802 is varied as indicated by a solid line and a broken line in FIG. 19.

The clock signal 1802 whose duty factor is varied in this manner, is input to the AND circuit 1803 in FIG. 18. Thus, the duty factor of the RZ signal 1804 is also varied.

Figure 20:
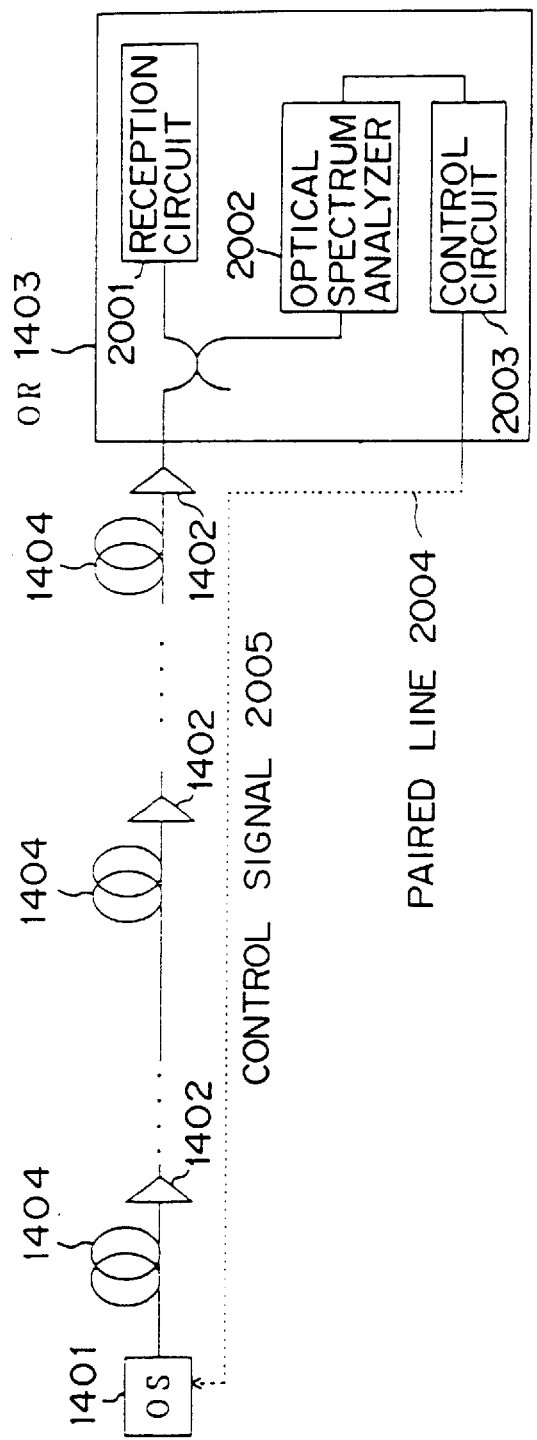
FIG. 20 is a general block diagram of a preferred embodiment of an optical communication system according to the present invention.

FIG. 20 is a general block diagram of the preferred embodiment of an optical communication system according to the present invention as includes a control loop for varying the duty factor.

In FIG. 20, parts endowed with the same numerals as those of the functional parts shown in FIG. 14A have functions similar to those of the corresponding parts in FIG. 14A, respectively.

In the optical receiver 1403, there are disposed a reception circuit 2001 for receiving the wavelength-multiplexed signal light, and an optical spectrum analyzer 2002 for analyzing the spectrum of the whole signal light received.

Which of the signal light waves is to have its duty factor varied, and how the duty factor is to be varied, are determined in a control circuit 2003 on the basis of the analyzed result of the optical spectrum analyzer 2002.

Besides, a control signal 2005 for varying the duty factor of the signal light wave having desired wavelength is notified to the optical sender 1401 through a paired line 2004 (a signal line which returns from the side of the optical receiver 1403 to the side of the optical sender 1401).

A control circuit within the optical sender 1401, not especially shown, varies the duty factor of the desired wavelength channel in such a way that the gate threshold voltage 1902 of the gate circuit 1903 shown in FIG. 19 and corresponding to the channel is controlled on the basis of the control signal 2005.

In the foregoing preferred embodiments of the present invention, the number of the wavelengths to be multiplexed can be designed at will.

In addition, the use of the existing DSF (dispersion shift fiber) for the transmission line and the use of the negative dispersion wavelength are not the indispensable requisites of the present invention.

Further, a great effect can be attained by combining the preemphasis based on the duty factor in the preferred embodiment, with the preemphasis based on the power in the prior art.

Moreover, it shall be covered within the scope of the present invention to use the mode of the RZ (return-to-zero) signal as the transmission coding format, to use the existing DSF's (dispersion shift fibers) as the transmission line, and to use the negative dispersion wavelengths.

What is claimed is:

1. A wavelength-multiplexing optical communication method for transmitting data of a plurality of channels using signal light waves having a plurality of wavelengths over a single optical fiber, comprising the steps of:

setting a transmission coding format for each of the signal light waves to be a return-to-zero mode; and allowing variation in a duty factor of each signal light wave to allow variation in a transmission characteristic of each signal light wave.

2. A wavelength-multiplexing optical communication method for transmitting data of a plurality of channels using signal light waves having a plurality of wavelengths over a single optical fiber, comprising the steps of:

setting a transmission coding format for each of the signal light waves to be a return-to-zero mode; and allowing variations in a power level and a duty factor of each signal light wave to allow variation in a transmission characteristic of each signal light wave.

3. A wavelength-multiplexing optical communication method for transmitting data of a plurality of channels using signal light waves having a plurality of wavelengths over a single optical fiber, comprising the steps of:

setting a transmission coding format for each of the signal light waves to be a return-to-zero mode; and allowing variation in a duty factor of each signal light wave to allow preemphasis of each signal light wave.

4. A wavelength-multiplexing optical communication method for transmitting data of a plurality of channels using signal light waves having a plurality of wavelengths over a single optical fiber, comprising the steps of:

setting a transmission coding format for each of the signal light waves to be a return-to-zero mode; and allowing variations in a power level and a duty factor of each signal light wave to allow preemphasis of said each signal light wave.

5. A wavelength-multiplexing optical communication method for transmitting data of a plurality of channels using signal light waves having a plurality of wavelengths over a single optical fiber, comprising the steps of:

setting a transmission coding format for each of the signal light waves to be a return-to-zero mode; and allowing variation in a duty factor of each signal light wave to allow compensation for ageing of a transmission characteristic of each signal light wave or for degradation in the transmission characteristic attributed to a cable laying repair.

6. A wavelength-multiplexing optical communication method for transmitting data of a plurality of channels using signal light waves having a plurality of wavelengths over a single optical fiber when upgrading an existing optical communication system, the method comprising the steps of:

setting a transmission coding format for each of the signal light waves to be a return-to-zero mode; and allowing variation in a duty factor of each signal light wave in accordance with a number of said signal light waves to be wavelength-multiplexed to allow adjustment of a transmission characteristic of each signal light wave.

7. A wavelength-multiplexing optical sending apparatus to send data of a plurality of channels using signal light waves having a plurality of wavelengths over a single optical fiber, the apparatus comprising:

a signal light generating circuit to generate each of the signal light waves in a return-to-zero mode as a transmission coding format; and a duty factor varying circuit to allow variation in a duty factor of each signal light wave generated by said signal light generating circuit allowing variation in a transmission characteristic of said each signal light wave.

8. A wavelength-multiplexing optical receiving apparatus which receives wavelength-multiplexed signal light waves having a plurality of wavelengths from an optical fiber, the apparatus comprising:

optical spectrum analysis means for analyzing a spectrum of the whole signal light received from the optical fiber; and duty-factor-variation control information notification means for transmitting control information about variations of a duty factor to a wavelength-multiplexing optical sending apparatus on the basis of an analysis by said optical spectrum analysis means.

9. A wavelength-multiplexing optical communication system comprising:

a wavelength-multiplexing optical sending apparatus to send data of a plurality of channels using signal light waves having a plurality of wavelengths over a single optical fiber, said sending apparatus comprising:

a signal light generating circuit to generate each of the signal light waves in a return-to-zero mode as a transmission coding format; and a duty factor varying circuit to allow variation in a duty factor of each signal light wave generated by said signal light generating circuit allowing variation in a transmission characteristic of said each signal light wave; and a wavelength-multiplexing optical receiving apparatus which receives the wavelength-multiplexed signal light waves from the optical fiber, said receiving apparatus comprising:

optical spectrum analysis means for analyzing a spectrum of the whole signal light received from the optical fiber; and duty-factor-variation control information notification means for transmitting control information about variations of the duty factor to said wavelength-multiplexing optical sending apparatus on the basis of an analyzed result of said optical spectrum analysis means.

10. A wavelength-multiplexing optical sending apparatus to send data of a plurality of channels using signal light waves having a plurality of wavelengths over a single optical fiber, the apparatus comprising:

a signal light generating circuit to generate each of the signal light waves in a return-to-zero mode as a transmission coding format; and a preemphasis circuit to allow variation in a duty factor of each of said signal light waves generated by said signal light generating circuit to subject said each signal light wave to preemphasis.

11. A wavelength-multiplexing optical receiving apparatus which receives wavelength-multiplexed signal light waves having plurality of wavelengths from an optical fiber, the apparatus comprising:

optical spectrum analysis means for analyzing a spectrum of the entire signal light waves received from said optical fiber; and duty-factor-variation control information notification means for transmitting control information about the variation of the duty factor to a wavelength-multiplexing optical sending apparatus based on an analysis of said optical spectrum analysis means.

12. A wavelength-multiplexing optical communication system comprising:

a wavelength-multiplexing optical sending apparatus to send data of a plurality of channels using signal light waves having a plurality of wavelengths over a single optical fiber, said sending apparatus comprising:

a signal light generating circuit to generate each of the signal light waves in a return-to-zero mode as a transmission coding format; and a reemphasis circuit to allow variation in a duty factor of each of said signal light waves generated by said signal light generating circuit to subject said each signal light wave to preemphasis; and a wavelength-multiplexing optical receiving apparatus which receives the wavelength-multiplexed signal light waves from the optical fiber, said receiving apparatus comprising:

optical spectrum analysis means for analyzing a spectrum of the entire signal light waves received from the optical fiber; and duty-factor-variation control information notification means for transmitting control information about the variation of the duty factor to said wavelength-multiplexing optical sending apparatus based on an analysis of said optical spectrum analysis means.

13. A wavelength-multiplexing optical sending apparatus which sends data of a plurality of channels using signal light waves having a plurality of wavelengths over a single optical fiber, the apparatus comprising:

a signal light generating circuit to generate each of the signal light waves in a return-to-zero mode as a transmission coding format; and a compensation circuit which allows variation in a duty factor of each signal light wave generated by said signal light generating circuit, allowing compensation for ageing in a transmission characteristic of each signal light wave or for degradation in the transmission characteristic attributed to a cable laying repair.

14. A wavelength-multiplexing optical receiving apparatus which receives wavelength-multiplexed signal light waves having a plurality of wavelengths from an optical fiber, the apparatus comprising:

optical spectrum analysis means for analyzing a spectrum of the whole signal light received from said optical fiber; and duty-factor-variation control information notification means for notifying control information about variations of a duty factor to a wavelength-multiplexing optical sending apparatus based on a result of the analysis of said optical spectrum analysis means.

15. A wavelength-multiplexing optical communication system comprising:

a wavelength-multiplexing optical sending apparatus which sends data of the plurality of channels using signal light waves having a plurality of wavelengths over a single optical fiber, said sending apparatus comprising:

a signal light generating circuit to generate each of the signal light waves in a return-to-zero mode as a transmission coding format; and a compensation circuit which allows variation in a duty factor of each signal light wave generated by said signal light generating circuit, allowing compensation for ageing in a transmission characteristic of each signal light wave or for degradation in the transmission characteristic attributed to a cable laying repair; and a wavelength-multiplexing optical receiving apparatus which receives the wavelength-multiplexed signal light waves from the optical fiber, said receiving apparatus comprising:

optical spectrum analysis means for analyzing a spectrum of the whole signal light received from the optical fiber; and duty-factor-variation control information notification means for sending control information about variations of the duty factor to said wavelength-multiplexing optical sending apparatus based on a result of the analysis performed by said optical spectrum analysis means.

16. A wavelength-multiplexing optical sending apparatus to send data of a plurality of channels using signal light waves having a plurality of wavelengths over a single optical fiber, the apparatus comprising:

a signal light generating circuit to generate each of the signal light waves in a return-to-zero mode as a transmission coding format; and an adjustment circuit which allows variation in a duty factor of each signal light wave in accordance with the number of signal light waves to be wavelength-multiplexed allowing adjustment of a transmission characteristic of said each signal light wave.

17. A wavelength-multiplexing optical receiving apparatus which receives wavelength-multiplexed signal light waves having the plurality of wavelengths from an optical fiber, the apparatus comprising:

optical spectrum analysis means for analyzing a spectrum of a signal light received from the optical fiber; and duty-factor-variation control information notification means for sending control information about variations of a duty factor to a wavelength-multiplexing optical sending apparatus based on a result of the analysis performed by said optical spectrum analysis means.

18. A wavelength-multiplexing optical communication system comprising:

a wavelength-multiplexing optical sending apparatus to transmit data of a plurality of channels using signal light waves having a plurality of wavelengths over the single optical fiber, said sending apparatus comprising:

a signal light generating circuit to generate each of the signal light waves in a return-to-zero mode as a transmission coding format; and an adjustment circuit which allows variation in a duty factor of each signal light wave in accordance with the number of signal light waves to be wavelength-multiplexed allowing adjustment of a transmission characteristic of said each signal light wave; and a wavelength-multiplexing optical receiving apparatus which receives the wavelength-multiplexed signal light waves from the optical fiber, said receiving apparatus comprising:

optical spectrum analysis means for analyzing a spectrum of the whole signal light received from the optical fiber; and duty-factor-variation control information notification means for sending control information about variations of the duty factor to said wavelength-multiplexing optical sending apparatus based on a result of the analysis of said optical spectrum analysis means.

19. A wavelength-multiplexing optical communication method wherein data of a plurality of channels are transmitted using signal light waves, having a plurality of wavelengths, over a single optical fiber, comprising the steps of:

setting a transmission coding format of each of the signal light waves to be a return-to-zero mode; and employing, for the signal light wavelength, a wavelength value at which a variational component of a delay time with respect to the wavelength value becomes negative.

* * * * *